US006861585B1

(12) United States Patent
Kiely

(10) Patent No.: US 6,861,585 B1
(45) Date of Patent: Mar. 1, 2005

(54) COLOR CODED SHIELDED CABLE/CONDUIT CONNECTORS AND COLOR CODED JUNCTION BOXES, SWITCH BOXES AND OUTLET BOXES

(75) Inventor: Kenneth M. Kiely, Milford, CT (US)

(73) Assignee: Bridgeport Fittings, Inc., Stratford, CT (US)

(*) Notice: Subject to any disclaimer, the term of this patent is extended or adjusted under 35 U.S.C. 154(b) by 0 days.

(21) Appl. No.: 10/915,668

(22) Filed: Aug. 10, 2004

Related U.S. Application Data

(63) Continuation of application No. 10/603,218, filed on Jun. 24, 2003, which is a continuation-in-part of application No. 10/183,805, filed on Jun. 26, 2002.

(60) Provisional application No. 60/313,885, filed on Aug. 21, 2001.

(51) Int. Cl.[7] .................................................. H02G 3/08

(52) U.S. Cl. ............................ 174/50; 174/53; 174/48; 220/3.2; 220/3.3; 220/4.02

(58) Field of Search ............................ 174/50, 48, 53, 174/58, 59, 135, 17 R, 57, 65 R; 220/3.2, 3.3, 3.4, 3.5, 3.6, 3.7, 3.8, 4.02; 439/491, 488, 489; 312/234; 361/600

(56) References Cited

U.S. PATENT DOCUMENTS 4,165,443 A * 8/1979 Figart et al. .................. 174/53
4,998,343 A * 3/1991 Costello .................... 248/68.1
5,243,130 A * 9/1993 Kitagawa ..................... 174/50
5,471,012 A * 11/1995 Opel ........................... 174/53
5,679,924 A * 10/1997 Young et al. ................. 174/50
5,775,935 A * 7/1998 Barna ......................... 439/488
5,965,846 A * 10/1999 Shotey et al. ................. 174/66
6,103,972 A * 8/2000 Hagarty ....................... 174/58
6,201,187 B1 * 3/2001 Burbine ....................... 174/53
6,617,511 B2 * 9/2003 Schultz et al. ................ 174/53

* cited by examiner

*Primary Examiner*—Dean A. Reichard
*Assistant Examiner*—Angel R. Estrada
(74) *Attorney, Agent, or Firm*—Melvin I. Stoltz

(57) ABSTRACT

By incorporating visually distinctive and readily identifiable indicia on at least a portion of a cable and/or conduit connector and/or its associated locking member and/or a switch box, a unique conduit, cable connecting member, and/or switch box is achieved which immediately informs any user of the precise electrical wires and circuit connections associated with the cable and/or conduit affixed thereto. By incorporating the visually distinctive and readily identifiable indicia on the portion of the connector mounted in the junction box and/or cable box and, if desired, on the cable box itself, any individual is able to immediately recognize and understand the precise electrical connections for the wires associated with the metal clad cables or electrical tubes or conduits affixed to the connector and cable box, since the portion of the connector displaying the indicia remains visible after final installation.

15 Claims, 4 Drawing Sheets

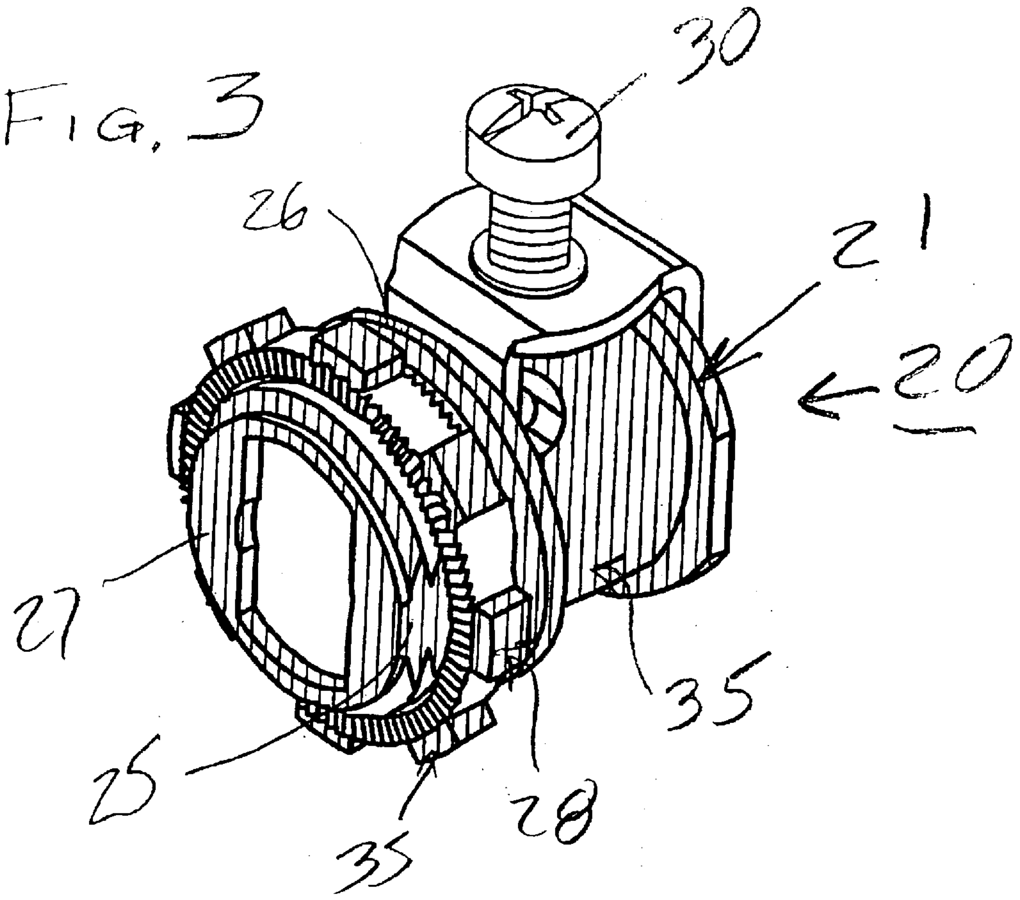
FIG. 3
FIG 4
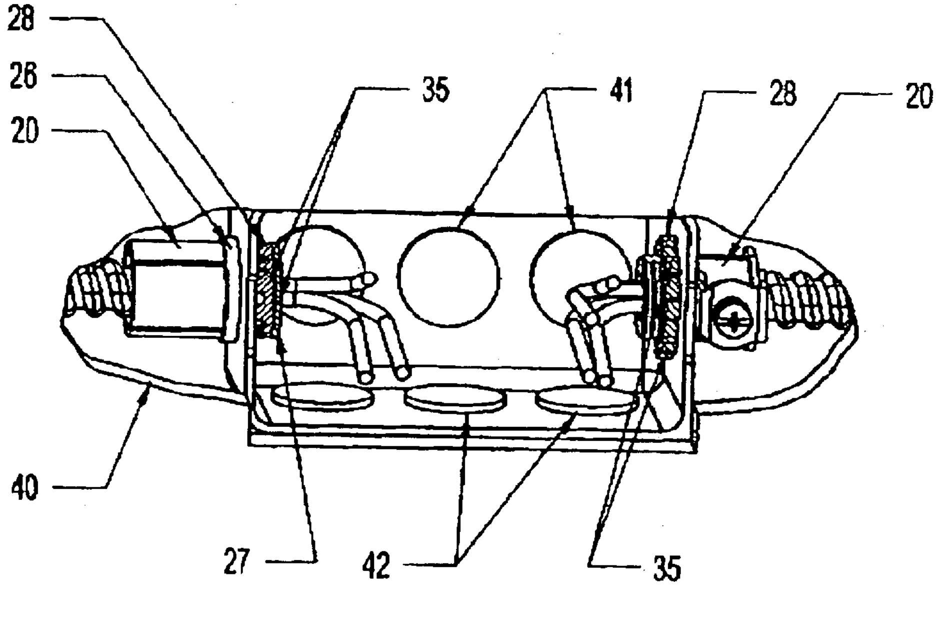

COLOR CODED SHIELDED CABLE/CONDUIT CONNECTORS AND COLOR CODED JUNCTION BOXES, SWITCH BOXES AND OUTLET BOXES

RELATED APPLICATIONS

This application is a Continuation patent application of U.S. patent application Ser. No. 10/603,218, filed Jun. 24, 2003 entitled COLOR CODED SHIELDED CABLE/CONDUIT CONNECTORS AND COLOR CODED JUNCTION BOXES, SWITCH BOXES AND OUTLET BOXES which is a Continuation-in-Part of U.S. patent application Ser. No. 10/183,805, filed Jun. 26, 2002 entitled COLOR CODED SHIELDED CABLE AND CONDUIT CONNECTORS which is related to U.S. Provisional Patent Application Ser. No. 60/313,885, filed Aug. 21, 2001 entitled COLOR CODED SHIELDED CABLE CONNECTORS.

TECHNICAL FIELD

This invention relates to connectors, cable boxes, and switch boxes for metal clad or shielded cables and/or electrical metal tubes or conduits and, more particularly, to such cable/conduit connectors and boxes which provide information regarding the connections of the wires contained therein.

BACKGROUND ART

In the construction fields, wherein commercial and residential buildings are constructed and/or renovated, it is typical for electrical power to be brought into the building at one particular location and distributed from that location to the rest of the building. In order to achieve this power distribution, one or more junction boxes are employed which receives the main power and allows the power to be-routed to the numerous locations throughout the building where power is needed.

In order to achieve the desired power distribution throughout the building, long lines of electrical metal tubes or conduits (EMT) and/or metal clad cables and/or armored cables are distributed throughout the building, with each of the conduits or cables having one end originating at the junction box or switch box. As is well known in this industry, the conduits or cables incorporate similar external constructions, while internally incorporating a wide variety of different types of conductors or wires. Since the electrical wires themselves vary greatly in diameter or gauge, depending upon the power requirements being satisfied, it is typical for similar wires to be retained in a conduit or single metal clad cable. As a result, numerous conduits or metal clad cables extend from junction/switch boxes to numerous locations throughout the building, with each conduit or cable serving a particular general purpose. In addition, numerous junction/switch boxes are also mounted in various locations, interconnecting cables or conduits to each other.

In this regard, in order to satisfy the wide variety of needs in a typical building, such as fire alarm systems, HVAC systems, data comm systems, health care facilities (HCF) systems, lighting fixtures, and the like, numerous different conduits or cables and junction/switch boxes are employed, each of which contain a particular wire type for a particular application. By distributing the conduits or cables and the junction/switch boxes throughout the building, all of the electrical needs throughout the building are satisfied.

In regard to the typical cables being employed, the most common type of cable employed in the building industry is, the metal-clad (type MC) cable. This cable is factory assembled with one or more insulated circuit conductors, with or without optical fiber members, enclosed in an armor of interlocking metal tape or smooth or corrugated metallic sheath. Each electrical conductor within the cable is individually insulated and can be copper, copper-clad aluminum, or aluminum. The metallic covering of the type MC cable typically comprises a smooth tube, a metallic sheath, a corrugated metallic sheath, or interlocking metal tape armor. The interlocking metal tape armor type MC cable is required to have a bare or insulated equipment grounding conductor in addition to any other conductors within the cable.

Another common cable type found in the building industry is the armored (type AC or type HCF) cable. Typically, this cable is constructed in the manner similar to the type MC.

Recently, manufacturers of metal clad and armored cables or installers have employed color coding in order to distinguish the different types of cables and designate the particular type of wires contained in the cables. Prior to use of color coding, the cables were virtually identical to each other, with no visual distinctions being available to inform electrical installers or building inspectors of the precise wire content within the cable. However, by employing color coding formed either on the cable itself or on labels placed around the cable by self-adhesive stickers, markings, and the like, easy identification of the various cables has been achieved.

Although this color coding designation on the cable has been beneficial to the industry during the construction process, once the wiring has been installed and inspected and the wires covered over with wallboard, paneling, and the like, the color-coded cabling is no longer visible and the benefit provided by the color coding is lost.

Once a building is completely constructed, one major purpose for color-, coded cabling is no longer applicable. However, it has been found that problems have developed with power transmission or with wiring breakages which require an electrical contractor to identify a particular cable type. Unfortunately, it is impossible to trace the wiring or know which wires coming into the switch box or junction box serve which particular type of electrical needs.

Therefore, it is a principal object of the present invention to provide a conduit and/or cable connecting member constructed for securely retaining and affixing an electrical metal tube or metal clad cable to a junction box, switch box, and/or outlet box while also providing visually distinctive indicia formed thereon for informing the user of the precise connections to which the electrical wires retained therein have been secured.

Another object of the present invention is to provide a conduit and/or cable connecting member having the characteristic features described above which is capable of being installed in any desired junction box, switch box, and/or outlet box with complete assurance that any inspector and/or user will be capable of immediately identifying the precise connections made by wires without requiring access to any other material.

Another object of the present invention is to provide a conduit and/or cable connecting member having the characteristic features described above which is employed in cooperation with junction boxes, switch boxes and/or outlet boxes which also provide visually distinctive indicia formed thereon for informing the user of the precise connections to which the electrical wires retained therein have been secured, thereby creating a visually distinctive wire designating system.

Another object of the present invention is to provide a visually distinctive wire designating system having the characteristic features described above which greatly expands the information known to any inspector and/or user after all of the wires, conduits, junction boxes, switch boxes, and outlet boxes have been fully installed and covered by walls and panels.

Other and more specific objects will in part be obvious and will in part appear hereinafter.

SUMMARY OF THE INVENTION

By employing the present invention, all of the difficulties and failings of the prior art have been overcome and an easily employed, convenient system is achieved for quickly and easily designating the precise wires associated with a particular type of conduit and/or cable and its color-coded designation or electrical conduit and the wire types mounted therein. In this way, the inability of existing technology has been eliminated.

In accordance with the present invention, a conduit and/or cable connecting member having an otherwise generally conventional construction incorporates visually distinctive and readily identifiable indicia formed on at least a portion of the connector and/or associated locking member to immediately inform any user, consumer, or inspector of the precise electrical wires and circuit connections associated with the cable and/or conduit affixed thereto. In addition, in order to further enhance and further enable the precise connections made by the installed wiring, junction boxes, switch boxes and/or outlet boxes are also constructed with readily identifiable indicia formed on the surfaces thereof for designating the wiring associated therewith. By incorporating visually distinctive and readily identifiable indicia on at least a portion of the connector mounted in the junction box, switch box, outlet box, and/or cable box, as well as on a surface of the junction box, switch box, outlet box, and/or cable box, any user, installer, building inspector, etc. is able to immediately recognize and understand the precise electrical connections for the wires associated with the metal clad cables or conduit affixed to the connector and mounted to the associated box, since the portion of the connector or box displaying the indicia remains visible after final installation of walls, panels, etc. has been completed.

In the prior art, any individual opening an outlet box and/or junction, box for inspecting or correcting any electrical problems is faced with a complete lack of knowledge regarding the type of wires housed therein and/or the connections or electrical circuits to which the wires extend. However, by employing the present invention, complete information of all such connections and electrical circuits becomes immediately evident to any individual by merely observing the indicia formed on the terminating and/or mounting end of the connector, the locking member associated therewith, and/or the surface of the box itself. In this way, all of the prior art inabilities are eliminated and any such individual is now empowered with complete knowledge of the entire electrical system by merely observing the visual indicia formed on the connectors, locking members, or boxes.

In the present invention, any desired indicia can be employed. Preferably, however, the indicia comprises one or more selected from the group consisting of color, designs, logos, pictures, and alpha-numeric designations.

As is fully detailed herein, the present invention is equally applicable to all connectors, whether employed for mounting electrical metal clad or armored cables to junction boxes, switch boxes, and/or outlet boxes or for mounting electrical metal tubes or conduits to junction boxes, switch boxes, and/or outlet boxes, as well as the boxes themselves. Regardless of the manner in which the electrical wires are extended through the building, the connectors and boxes associated therewith all benefit from incorporating thereon the readily identifiable and visually distinctive indicia of the present invention.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 3 is a perspective view of a further alternate embodiment of a shielded cable connector incorporating the presenting invention;

FIG. 4 is a perspective view of the shielded cable connectors of FIGS. 1 and 2 shown mounted in an electrical box;

DETAILED DISCLOSURE

By referring to FIGS. 1–6 along with the following detailed disclosure, the construction and operation of several alternate embodiments of the present invention can best be understood. In order to provide a full and complete disclosure, alternate embodiments have been shown and are fully detailed herein. However, further alternate connector and box embodiments can be employed without departing from the scope of the present invention. Consequently, it should be understood that the following disclosure is intended for exemplary purposes only, and not as a limitation of the present invention.

Furthermore, the connector of the present invention is described herein as being affixed to shielded, wire bearing cables and/or to electrical metal tubes or conduits. However, this use is depicted and discussed for exemplary purposes only, with the present invention having equal applicability to use any alternate carrier systems. In addition, exemplary switch/outlet boxes are shown and detailed herein. However, numerous other box constructions can be employed with equal efficacy. By employing the present invention the precise connections for each wire bearing conduit in each box are easily known.

Figure 1:
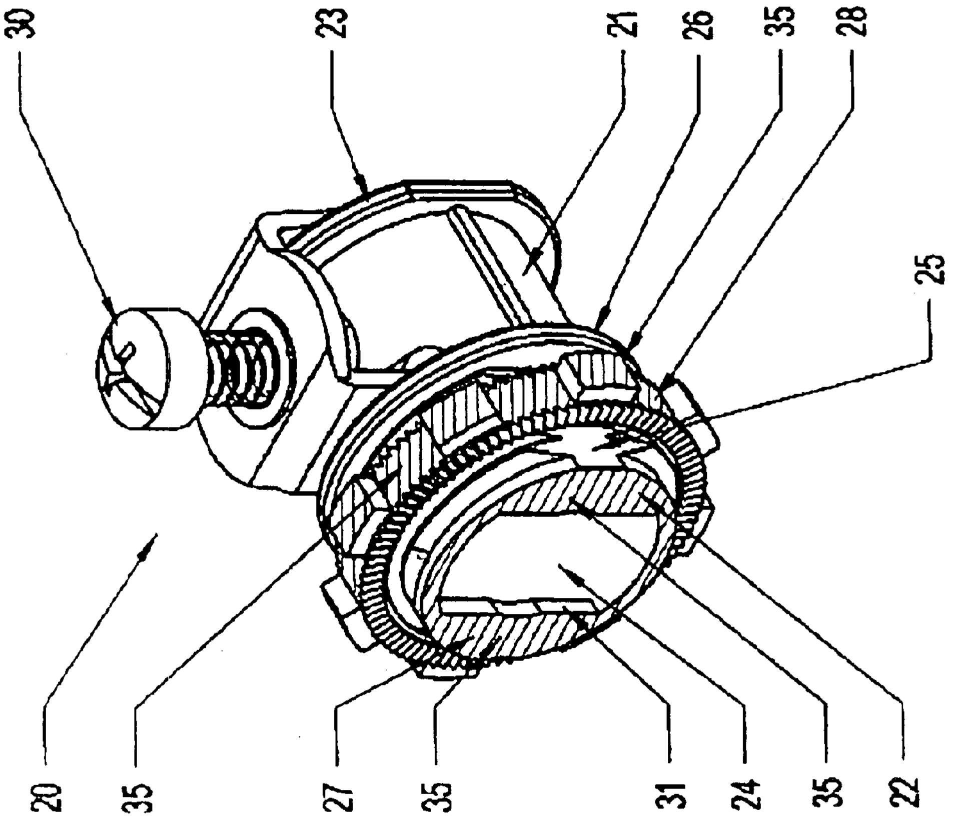
FIG. 1 is a perspective view of one embodiment of a shielded cable connector incorporating the present invention.
Figure 2:
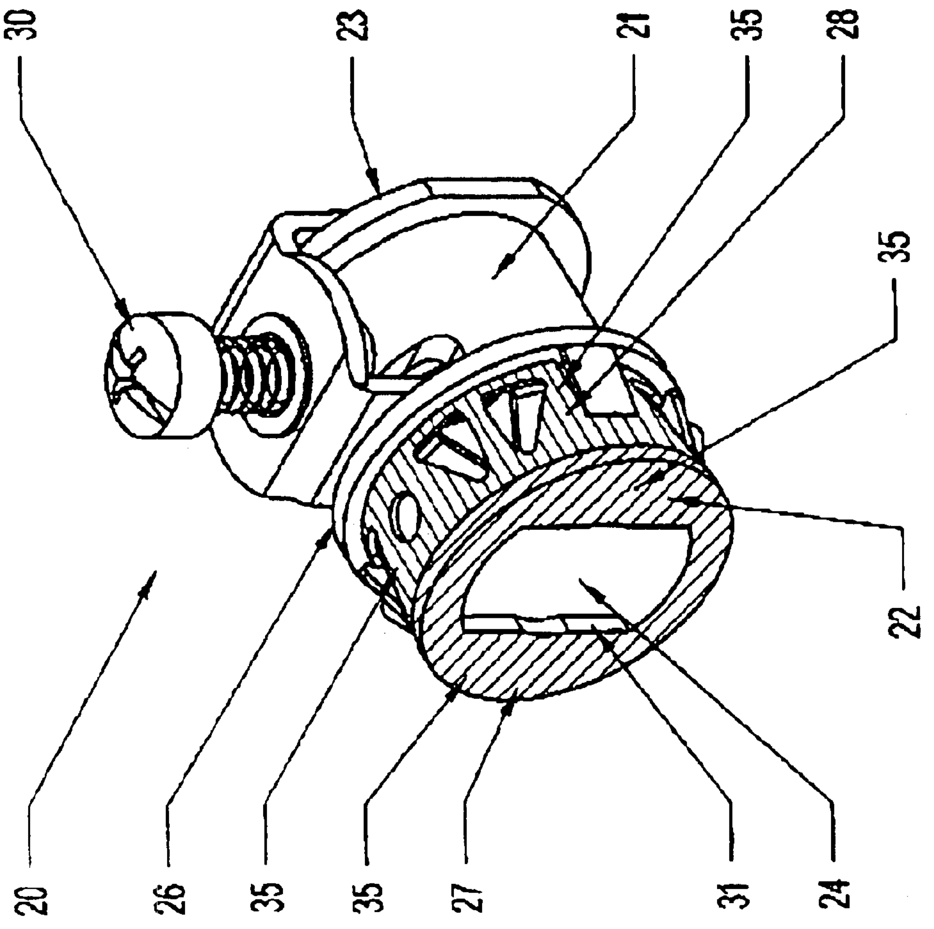
FIG. 2 is a perspective view of an alternate embodiment of a shielded cable connector incorporating the present invention.

In FIGS. 1 and 2, alternate constructions for cable and/or conduit connector 20 are depicted. In those embodiments, cable and/or conduit connector 20 incorporates connector housing 21 which comprises a proximal end 22 and a distal end 23. In the conventional manner, connector housing 21 comprises a generally hollow cylindrical shape having elongated aperture 24 extending the entire length thereof, and constructed for receiving and securely holding a shielded cable and/or electrical metal tube or conduit therein by employing set screw 30. In addition, proximal end 22 comprises a wall member 27, and directly adjacent proximal end 22 is locking member receiving zone 25 which extends from proximal end 22 to enlarged flange 26.

In the embodiment shown in FIG. 1, locking member receiving zone 25 comprises a threaded surface having a diameter less than the diameter of flange 26. In addition, receiving zone 25 is constructed for threadedly receiving locking member 28. In this embodiments locking member 28 comprises a nut member threadedly mounted to receiving zone 25.

As is well known in the art, shielded cable connector 20 is employed by advancing one end of a shielded cable or conduit through central aperture 24 of housing 21, and securing the cable or conduit therein by advancing set screw 30 into engagement with the shielded cable or conduit. In addition, with the shielded cable/conduit securely affixed to connector housing 21, the electrical wires contained in the shielded cable conduit extend outwardly from aperture 24 through portal 31, which is formed with proximal end 22.

In typical use, as shown in FIG. 4, shielded cable/conduit connector 20 is cooperatively associated with junction box or other electrical housing 40 employed in the wiring of the building. Each junction box or electrical housing 40 incorporates a plurality of apertures 41 or knockout plugs 42 which form apertures 41.

In order to secure shielded cable conduit connector 20 with junction box or electrical housing 40, proximal end 22 and threaded zone 25 are advanced through apertures 41 of junction box or housing 40 until flange 26 abuts the outer surface of box or housing 40. In this regard, flange 26 is designed with a diameter which is greater than the diameter of apertures 41 employed in junction boxes or electrical housings 40, while the diameter of threaded zone 25 comprises a diameter less than the diameter forming aperture 41.

Once shielded cable/conduit connector 20 is positioned in the desired location in aperture 41 of the junction box or electrical housing 40, locking member 28 is mounted onto locking member receiving zone 25 and threadedly advanced on receiving zone 25 until securely abutting the inside wall of the junction box or housing 40. Once in this fully advanced position, cable connector 20 is secured to the junction box or the electrical housing 40, securely retained in position by the sandwiched engagement of the wall of the junction box 40 by locking member 28 and flange 26.

In shielded cable/conduit connector 20 of FIG. 2, locking member receiving zone 25 comprises a surface for receiving locking member 28 which is in the form of a circular shaped ring member peripherally surrounding and securely engaged with receiving zone 25. Typically, a recessed zone is formed between proximal end 22 and flange 26 in order to receive and secure locking member 28 thereon. In addition, as with the previous embodiment detailed above, set screw 30 is mounted to connector housing 21 for use in securely engaging and lockingly holding the shielded cable member in connector 20, with the electrical wires thereof extending through portal 31 thereof.

Another typical, well known embodiment for a shielded cable connector comprises a housing similar in construction to housing 21, except that set screw 30 is not employed. Instead, an inner sleeve member is telescopically inserted into the housing and securely engaged therewith, with the inner sleeve member incorporating finger members for lockingly holding and securely engaging the outer surface of the shielded cable. A cable connector having this construction is thoroughly disclosed in my recently issued U.S. Pat. Nos. 6,444,907 and 6,555,750 as well as my co-pending U.S. patent application entitled Electrical Cable Connector, filed Apr. 15, 2003, and bearing Ser. No. 10/414,529. The pertinent portions of these patents and patent application are hereby incorporated by reference for the disclosure contained therein of cable connector having this construction.

As is evident to one having ordinary skill in this art, the teaching of the present invention is equally applicable to any cable connector of the construction defined in my patents and co-pending patent application. As a result, the readily identifiable, visually distinctive indicia detailed herein may be employed on cable connectors of this general nature, without departing from the scope of this invention.

In employing cable connector 20 of FIG. 2, proximal end 22 of shielded cable/conduit connector 20 is advanced through aperture 41 formed in junction box or electrical housing 40 to which connector 20 is to be mounted. With locking member 28 mounted to receiving zone 25 of connector 20, locking member 28 is also advanced through aperture formed 41 in junction box or electrical housing 40 until flange 26 abuts the outer surface of box/housing 40.

As is well known in the art, locking member 28 is constructed with a plurality of movable or flexible flanges or tabs which enable locking member 28 to be advanced through aperture 41 formed in junction box 40. However, once fully advanced, locking member 28 prevents connector 20 from being removed therefrom. As result, this embodiment also provides secure engagement of cable connector 20 with any desired junction box or electrical housing 40.

In accordance with the present invention, indicia 35 is formed on part or all of the exposed surface of locking member 28, as fully depicted in both FIGS. 1 and 2. In addition, as also shown in FIGS. 1 and 2, indicia 35 is also formed on wall 27 of proximal end 22. In this regard, indicia 35 may be formed on both wall 27 and locking member 28 or, if desired, may be formed on either wall 27 or locking member 28. Furthermore, if desired, indicia 35 may be formed on part or all of locking member receiving zone 25, or any other desired portion of housing 21.

In this regard, FIG. 3 is provided wherein the connector of FIG. 1 is depicted, with indicia 35 formed on substantially all surfaces thereof. As is evident from FIGS. 1–3, and the disclosure contained herein, the present invention contemplates and teaches the use of indicia 35 on connector 20, whether the indicia is used on selected portions or surfaces thereof, or whether indicia 35 is used on substantially all surfaces thereof.

In carrying out the teaching of the present invention, indicia 35 may comprise any desired form or content, as long as the desired information is communicated to the user. In this regard, however, indicia 35 preferably comprises at least one selected from the group consisting of colors, symbols, designs, logos, pictures, and alphanumeric designations.

In its preferred form, indicia 35 comprises a color or a color coding which corresponds to the color coding associated with the shielded cable or conduit to which connector 20 is mounted and the equipment or circuits to which the wires contained therein have been secured. In this way, the color coding shown on the outer surface of the shielded cable or conduit and now hidden from view, can be readily determined by merely observing the color or color coding formed by indicia 35 of locking member 28, on wall 27, and/or on any other surface of connector 20. As shown in FIG. 4, with connectors 20 incorporating indicia 35, as detailed above, the indicia remains visible to anyone by merely looking into the junction box or housing. As a result, the prior art limitations are eliminated.

In order to fully demonstrate the implementation and efficacy of the present invention, FIG. 1 is shown with indicia 35 formed on wall member 27 of housing 21 comprising the color blue. As depicted, the lining representing the color blue has been applied to the entire surface defined by wall member 27. However, as detailed above, indicia 35 may be applied only to portions of wall 27, if so desired, or to any other surface of housing 21, either partially or in its entirety.

Furthermore, locking member 28, which in FIG. 1 comprises a nut member, is depicted with indicia 35 comprising the color green, with indicia 35 applied to the entire outer surface of locking member 28. However, if desired, indicia 35 may be applied to portions of the surface of locking member 28 while still providing the same unique results achieved by the present invention.

In the cable/conduit connector 20 shown in FIG. 2, wall member 27 of proximal end 22 of housing 21 is depicted with indicia 35 being formed thereon and comprising the color green. In addition, indicia 35 is shown applied to the entire proximal end 22 of housing 21, extending from wall member 27 to flange 26 and including locking member receiving zone 25. Of course, as detailed above, if desired, indicia 35 may be applied to only portions of wall member 27, as well as proximal end 22 and locking member receiving zone 25, or to any other desired portion of housing 21, either partially or entirely.

Furthermore, locking member 28, which in this embodiment comprises a circular-shaped ring member, is depicted with indicia 35 comprising the color brown. Furthermore, although the entire exposed surface of locking member 28 is depicted with indicia 35 applied thereto, indicia 35 may be applied to only portions of the outer surface of locking member 28, if so desired.

In FIG. 3, a further alternate embodiment of the present invention is depicted, wherein housing 21 of cable/conduit connector 20 is depicted with indicia 35 formed on substantially the entire outer surface of housing 21. In addition, locking member 28 is depicted with indicia 35 formed on portions thereof. In this depiction, both housing 21 and locking member 28 are shown with indicia 35 comprising the color red. However, as detailed above, indicia 35 may comprise any color or other desired indicia.

Furthermore, as fully described herein, indicia 35 may be formed on any desired portion of housing 21 of cable/conduit connector 20, or on housing 21 in its entirety. Similarly, indicia 35 may be formed on any desired portion of locking member 28, or on all surfaces of locking member 28 if desired.

The use of color lining in FIGS. 1–3, for depicting indicia 35, is provided for exemplary purposes only, in order to be certain that the present invention is fully disclosed, taught, and understood. However, indicia 35 is clearly not limited to specific color designations and may comprise any form or content desired by the user, as discussed above. Furthermore, if color is employed, any desired color and color combinations can be used in carrying out the teaching of this invention.

By employing the identical color coding which has been adopted as a standard for shielded cable wiring, an electrical contractor can quickly determine which shielded cable contains the precise wiring for which a problem has occurred. In this way, the contractor, immediately knows the shielded cable and connection which needs to be investigated. Prior to the present invention, contractors were completely unable to determine which connector was associated with which shielded cable, and all of the information provided by the indicia formed on the shielded cable was completely lost.

As detailed above, connectors 20 of FIGS. 1–3 are preferably constructed with the outer surface of locking member 28, wall 27, and/or housing 21 incorporating indicia 35 in the form of specific colors used in combination to designate the standard wire color code presently adopted and employed in the industry. In this regard, Table I provides color combinations which may be employed in the present invention to provide any user with the ability to quickly and easily know the type of wiring mounted to each connector 20.

TABLE I

CONNECTOR COLOR CODING

| Color Code | Cable Type | No. of Conductors | Voltage |
|---|---|---|---|
| Blue Connector | MC | 2 | 120 |
| Blue Connector w/Red Locknut or Ring | MC | 3 | 120 |
| Blue Connector w/Green Locknut or Ring | MCIC | 2 | 120 |
| Black Connector | AC | 2 | 120 |
| Black Connector w/Red Locknut or Ring | AC | 3 | 120 |
| Green Connector | HCF | 2 | 120 |
| Green Connector w/Red Locknut or Ring | HCF | 3 | 120 |
| Blue Connector w/Brown Locknut or Ring | MC | 2 Brown | 277 |
| Blue Connector w/Orange Locknut or Ring | MC | 2 Orange | 277 |
| Blue Connector w/Yellow Locknut or Ring | MC | 2 Yellow | 277 |
| Black Connector w/Brown Locknut or Ring | MC | 2 Brown | 277 |
| Black Connector w/Orange Locknut or Ring | MC | 2 Orange | 277 |
| Black Connector w/Yellow Locknut or Ring | MC | 2 Yellow | 277 |
| Green Connector w/Brown Locknut or Ring | MC | 2 Brown | 277 |
| Green Connector w/Orange Locknut or Ring | MC | 2 Orange | 277 |
| Green Connector w/Yellow Locknut or Ring | MC | 2 Yellow | 277 |
| Red Connector | Fire Alarm | | |
| Orange Connector | MOF | | |

If desired, alternate indicia can be employed such as symbols, logos, designs, pictures, and alpha-numeric designations. However, for ease-of-use and understanding, a uniform color or color code is preferred. Furthermore, if desired, indicia 35 may be placed on only specific locations formed by the outer surface of locking member 28, wall 27, and/or housing 21. Alternatively, and most preferably, indicia 35 is formed on all exposed surfaces of locking member 28, wall 27, and/or housing 21, thereby assuring ready identification and ease of distinguishability of one cable connector from other cable connector, with maximum information being provided to electrical contractors.

Figure 5:
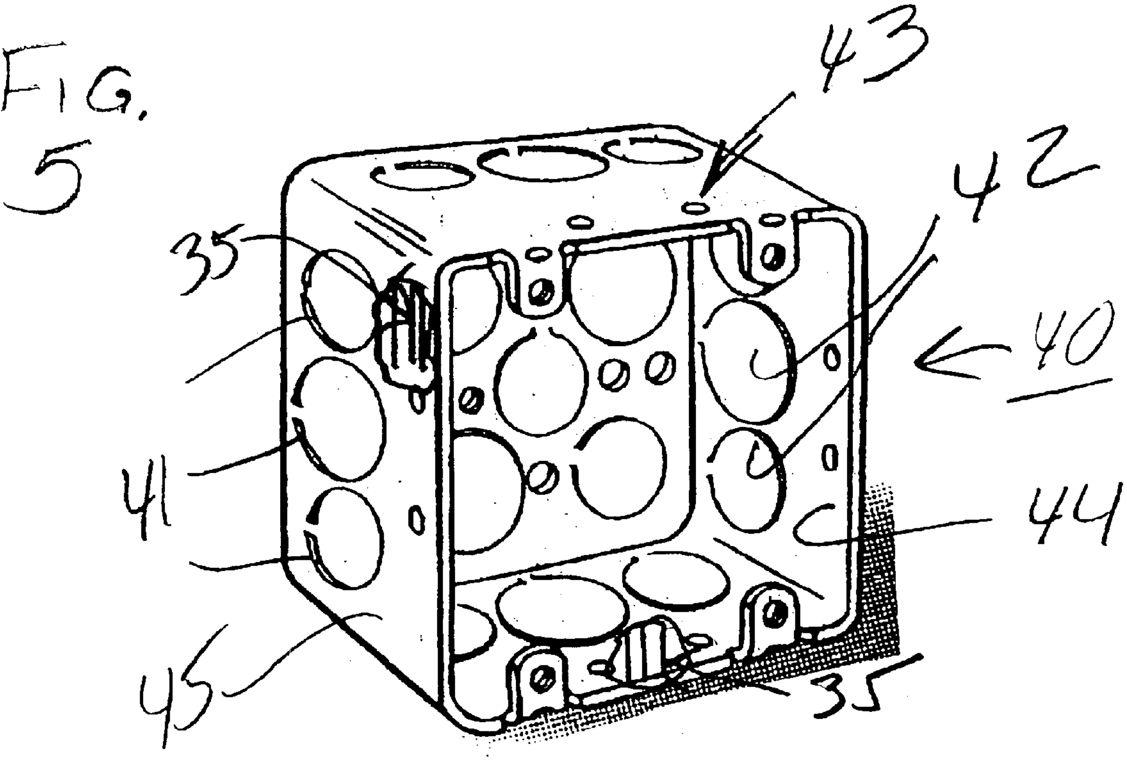
FIG. 5 is a perspective view of one embodiment of an electrical box incorporating the present invention.
Figure 6:
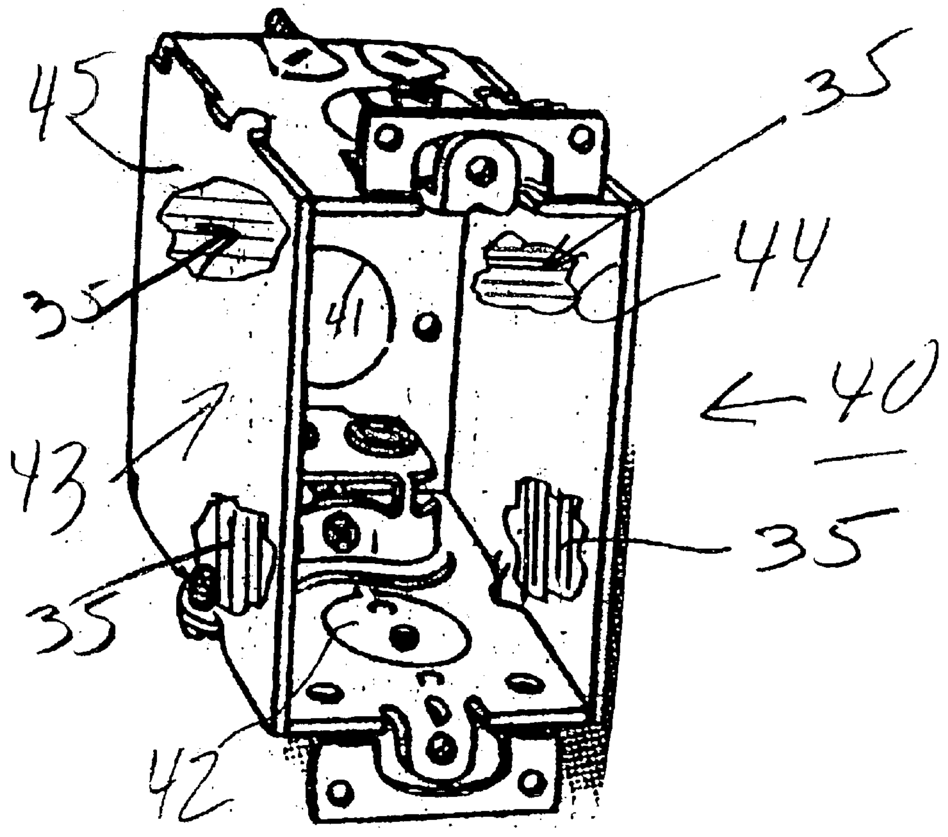
FIG. 6 is a perspective view of an alternate embodiment of an electrical box incorporating the present invention.

By referring to FIGS. 5 and 6, a further alternate embodiment of the present invention can best be understood. As shown therein, junction box, switch box, and/or outlet box 40 is depicted incorporating the teaching of the present invention. As shown, junction box, switch box, and/or outlet box 40 incorporates indicia 35 formed on one or more surfaces thereof in order to enable any user to quickly and easily immediately know the type of wiring mounted to box 40.

As shown in FIGS. 5 and 6, junction box, switch box, and/or outlet box 40 comprises housing 43 which is defined by outside surface 45 and inside surface 44. In the typical construction, housing 43 comprises a substantially closed housing, except for front portal 46. In this way, access to the interior of housing 43 is easily attained. In addition, as detailed above, box 40 incorporates apertures 41 and/or knockout plugs 42 forming a part of inside surface 43 and/pr outside surface 44.

In use, junction box, switch box, and/or outlet box 40 is employed in various locations throughout a home or building for enabling wires to be joined in a particular location in the house or building. This juncture point can be used for enabling wires to be distributed to different areas from one central location, as well as enabling access to the use of the wiring by plugs, switches, and the like.

Regardless of the particular purpose for which box 40 is employed, it is common for most installations to have all wires of a particular type or wires of a particular application to be mounted in or connected to the same junction box, switchbox, and/or outlet box 40. As a result, by employing the teaching of the present invention and forming indicia 35 on one or more surfaces of box 40, a user is able to quickly and immediately know the precise wiring application for which each box has been employed and the precise application to which of the wires mounted therein have been connected. As a result, specific wires can be quickly and easily identified and any necessary repairs can be efficiently made.

In accordance with the present invention, indicia 35 is formed on part or all of inside surface 45 and/or outside surface 44 of housing 43 of box 40. In this way, regardless of the location or position of box 40, indicia 35 can be quickly and easily seen and the wiring connected thereto immediately identified.

As discussed above, indicia 35 may comprise any desired form or content, as long as the desired information is communicated to the user. In this regard, although indicia 35 preferably comprises at least one selected from the group consisting of colors, symbols, designs, logos, pictures, and alpha numeric designations, any other desired indicia can be employed with equal efficacy.

In its preferred form, indicia 35 applied to housing 43 of box 40 comprises a color or a color coding which corresponds to the color coding associated with the shielded cable or conduit to which connectors 20 are mounted and the equipment or circuits to which the wires contained therein have been secured. In this way, the color coding shown on outside surface 44 and/or inside surface 45 of housing 43 of box 40 can be readily determined by merely observing the color or color coding formed by indicia 35 on the walls thereof.

Furthermore, although cable/conduit connectors 20 detailed above are preferably employed in combination with boxes 40, this embodiment of the present invention can be employed with conventional cable/conduit connectors on which no color coding has been applied. Consequently, all users will benefit from the inherent advantages of having indicia 35 associated with the wiring system of any particular house or building.

In addition, if color is employed for indicia 35, any desired color and color combinations can be used in carrying out the teaching of this invention. By employing the identical color coding which has been adopted as a standard for shielded cable wiring, as detailed above and shown in Table I, an electrical contractor can quickly determine which shielded cable contains the precise wiring for which a problem has occurred. In this way, the contractor immediately knows the shielded cable and connection which needs to be investigated, and the ability of the present invention to further enhance and improve the quality and speed of a repair is evident.

For exemplary purposes, FIG. 5 shows indicia 35 as a red color applied to both inside surface 44 and outside surface 45 of electrical box 40. Although the red color is depicted on only a portion of these surfaces, it is evident that the color can be applied to the entire surface if desired. Furthermore, as discussed above, either inside surface 44 or outside surface 45 can incorporate indicia 35, with the other surface being free to any indicia 35.

In FIG. 6, electrical box 40 is shown with indicia 35 comprising two colors, namely blue and red on both inside surface 44 and outside surface 45. As stated above, if desired, only one surface may comprise indicia 35 if desired.

In order to enable electrical box 40 of the present invention to benefit the user to the greatest extent, indicia 35 preferably comprises a color code consistent with the standard wire color code presented adopted and employed in the industry. In this regard, Table II provides color combinations which may be employed on surfaces 44 and 45 of box 40 in order to enable the user to quickly and easily know the type of wiring mounted to box 40. In this way, all of the benefits of the present invention are realized.

TABLE II

COLOR CODING FOR ELECTRICAL BOXES

| Color Code | Cable Type | No. of Conductors | Voltage |
|---|---|---|---|
| Blue | MC | 2 | 120 |
| Blue and Red | MC | 3 | 120 |
| Blue and Green | MCIC | 2 | 120 |
| Black | AC | 2 | 120 |
| Black and Red | AC | 3 | 120 |
| Green | HCF | 2 | 120 |
| Green and Red | HCF | 3 | 120 |
| Blue and Brown | MC | 2 Brown | 277 |
| Blue and Orange | MC | 2 Orange | 277 |
| Blue and Yellow | MC | 2 Yellow | 277 |
| Black and Brown | MC | 2 Brown | 277 |
| Black and Orange | MC | 2 Orange | 277 |
| Black and Yellow | MC | 2 Yellow | 277 |
| Green and Brown | MC | 2 Brown | 277 |
| Green and Orange | MC | 2 Orange | 277 |
| Green and Yellow | MC | 2 Yellow | 277 |
| Red | Fire Alarm | | |
| Orange | MOF | | |

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An electrical box constructed for receiving one or more cable/conduit connectors constructed for securing an electrical cable and/or conduit to the box and for providing information regarding an electrical circuit or equipment to which the cable/conduit is connected, said electrical box comprising:

A. a housing a. defining an interior zone formed by a plurality of cooperating wall members, b. constructed for receiving and securely retaining a plurality of electrical cable/conduit connectors therewith, and c. comprising a closed end hollow rectangular shape incorporating a plurality of substantially flat, cooperating wall members, each having an inside surface and an outside surface, and a plurality of apertures formed in said wall members enabling the securely affixation of the electrical cable/conduits connected therein; and B. indicia a. formed directly on at least one interior surface of one of said wall members of the housing and covering a major portion of said interior surface, and b. constructed for providing information regarding the electrical circuit or equipment to which the electrical cable/conduit connectors mounted to the housing is connected;

whereby said indicia is visible after installation of the electrical box and covering of all studs and partitions, providing the user with pertinent information regarding the electrical cable and the connections associated therewith by merely removing a cover of the box and visually observing the indicia formed on said interior surface thereof.

2. The electrical box defined in claim 1, wherein said indicia is further defined as comprising one selected from the group consisting of colors, designs, logos, pictures and alpha-numeric designations.

3. The electrical box defined in claim 2, wherein the indicia is further defined as being formed on the entire interior surface of the wall member of the component to which it is applied.

4. The electrical box defined in claim 1, wherein said housing further comprises a plurality of removable plugs or plates associated with the apertures for covering the apertures prior to use.

5. The electrical box defined in claim 4, wherein each aperture is constructed for enabling a cable/conduit connector to be telescopically inserted into the aperture and securely retained therein.

6. The electrical box defined in claim 1, wherein said box comprises one selected from the group consisting of junction boxes, switch boxes, and outlet boxes.

7. The electrical box defined in claim 1, wherein said indicia is readily identifiable and visually distinctive and comprises a first indicia formed on one portion of one interior wall surface of the housing and a second indicia formed on a second portion of one interior wall surface of the housing.

8. The electrical box defined in claim 7, wherein said first indicia and said second indicia are identical.

9. The electrical box defined in claim 7, wherein said first indicia is visually distinguishable from said second indicia.

10. The electrical box defined in claim 7, wherein the first indicia is formed partially covering at least one inside wall surface.

11. The electrical box defined in claim 7, wherein said first indicia is formed covering at least one inside wall surface in its entirety.

12. The electrical box defined in claim 7, wherein said second indicia is formed partially covering at least one outside wall surface.

13. The electrical box defined in claim 7, wherein said second at least one outside wall surface.

14. The electrical box defined in claim 7, wherein the first indicia and the second indicia are formed on the same interior wall surface.

15. The electrical box defined in claim 7, wherein the first indicia and the second indica are formed on different interior wall surfaces.

* * * * *